United States Patent Office 3,468,601
Patented Sept. 23, 1969

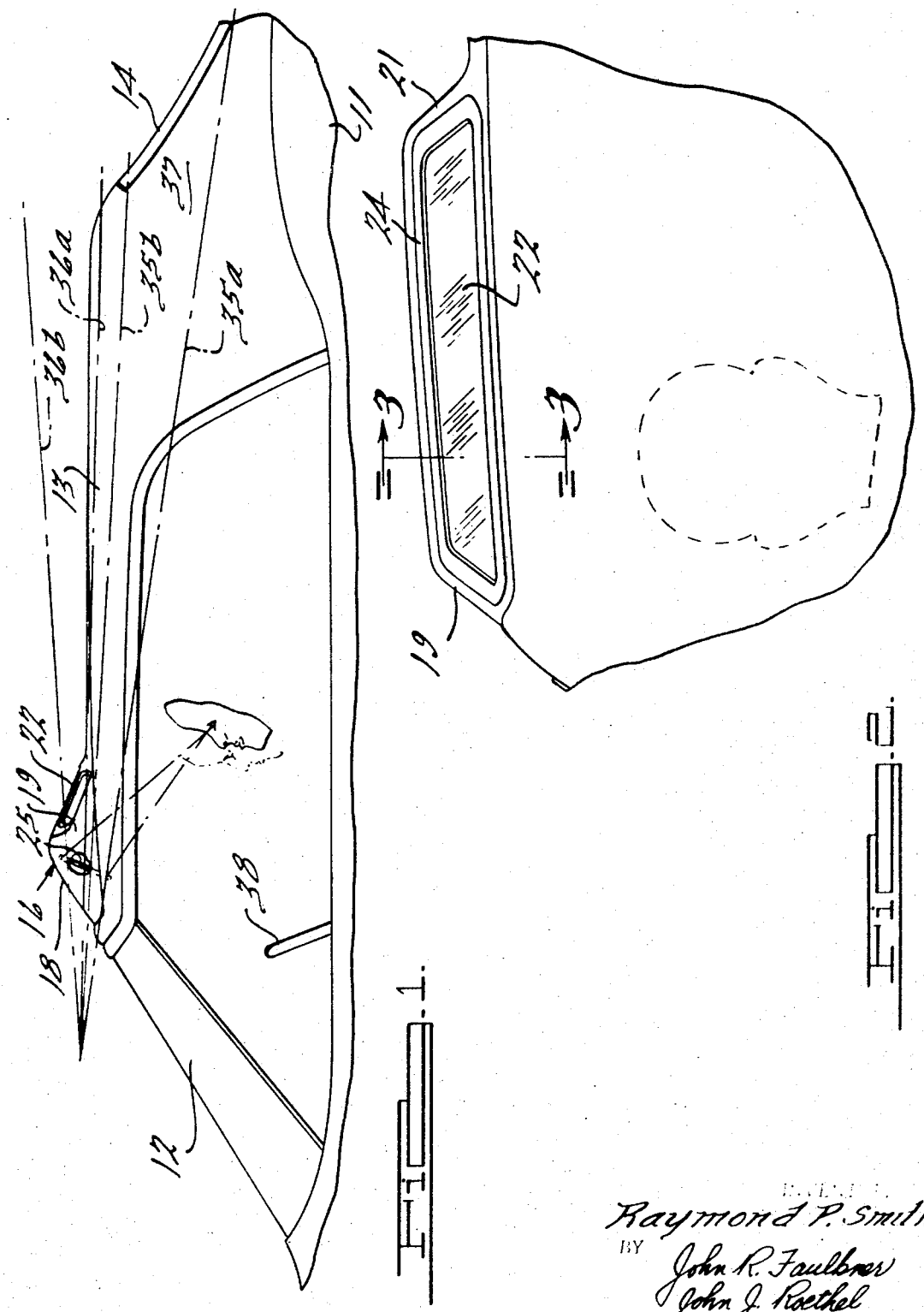

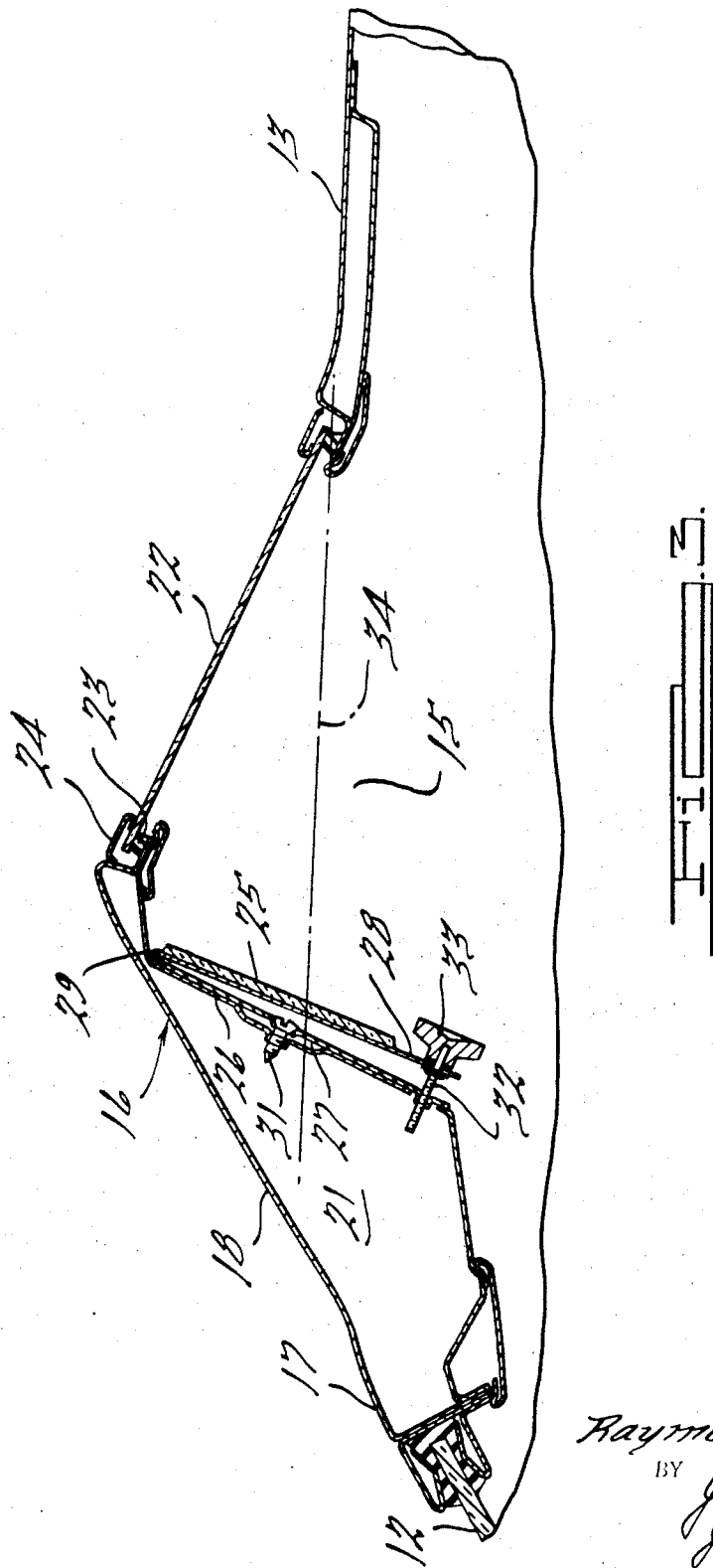

3,468,601
VEHICLE REARVIEW MIRROR SYSTEM
Raymond P. Smith, Southfield, Mich., assignor to Ford Motor Company, Dearborn, Mich., a corporation of Delaware
Filed Oct. 11, 1967, Ser. No. 674,454
Int. Cl. G02b 5/08, 7/18
U.S. Cl. 350—307                                6 Claims

ABSTRACT OF THE DISCLOSURE

A vehicular rearview mirror system having a rearview mirror mounted in an aperture in the vehicle body roof panel, the mirror being supported with its plane intersected by the plane of the roof panel to provide dual fields of vision above and below the roof panel.

BACKGROUND OF THE INVENTION

Current vehicle body styling trends, which place particular emphasis on "fast-back" designs having radically sloping rear windows and hard-top designs having large opaque panels at the rear corners of the vehicle top, have made it extremely difficult to provide interiorly mounted rear view mirror systems having a wide field of vision.

The problem of adequate rear view vision for vehicle bodies having radically sloping rear windows was described in U.S. Patent No. 2,082,775 issued June 8, 1937. The patentee disclosed a solution of the problem involving the use of two mirrors, one a conventionally mounted mirror centrally located above the front windshield to provide a field of vision through the vehicle rear window and a second mirror positioned above the operator exteriorly of the roof panel and visible through a window aperture in the roof panel to provide a field of vision over the roof panel.

These also have been a number of solutions proposed for improving the field of vision involving multiple mirrors arranged in a multiplicity of periscopic relationships. Representative patents embodying periscopic principles are: U.S. Patents 2,645,129; 2,942,522 and 3,229,580.

Any multiple mirror system, whether it be the dual mirror system of Patent 2,082,775 or a periscopic mirror system has one inherent disadvantage. That is, more than one mirror may have to be adjusted to suit the eye height of the individual driving the vehicle to derive the maximum field of vision obtainable from the system.

It is the object of the present invention to provide a rear view mirror system embodying a single adjustable mirror giving dual fields of vision, one of which extends below the roof panel through the rear window and the other of which extends over the roof panel.

BRIEF SUMMARY OF THE INVENTION

The present invention embodies a rear view mirror system for a vehicle having an upper body structure comprising a windshield, a roof panel extending rearwardly of the windshield and a window at the rear of the roof panel. A rearwardly facing mirror is supported in an aperture in the roof panel rearwardly adjacent the windshield. The mirror is supported so that its plane is intersected by the plane of the roof panel to provide dual fields of vision, one of which extends below the roof panel through the rear window and the other of which extends over the roof panel.

BRIEF DESCRIPTION OF THE DRAWINGS

Other objects, advantages and features of the present invention will be made more apparent at this description proceeds, reference being had to the accompanying drawings, wherein:

FIG. 1 is a fragmentary view of the vehicle body having a rear view mirror system embodying the present invention mounted therein;

FIG. 2 is a fragmentary view looking at the vehicle roof panel from the rear of the vehicle; and FIG. 3 is a view taken on the line 3—3 of FIG. 2.

DETAILED DESCRIPTION OF THE INVENTION

Referring now to the drawings, FIG. 1 illustrates the fragmentary upper portion of a vehicle body 11. This upper body portion 11 comprises a windshield 12, a roof panel 13 extending rearwardly of the windshield and a window 14 at the rear of the roof panel 13.

The roof panel 13 differs from a conventional roof panel in that it is fitted with a laterally extending aperture 15 rearwardly adjacent the upper edge of the windshield 12. The aperture 15 is bounded by a correspondingly laterally extending housing 16 which extends upwardly from the forward or windshield header edge 17 of the roof panel. The housing 16 has opaque walls on the forward side 18 and on the sides 19 and 21 extending longitudinally of the vehicle body.

The housing 16 has at its rear side an angularly inclined window 22 therein. The window 22 is retained by appropriate weather stripping 23 and reveal moldings 24.

An elongated laterally extending mirror 25 is supported on an inner panel 26 of the housing. The mirror support comprises a pair of plates 27 and 28 hingedly coupled to each other by a hinge pin 29. Plate 27 is secured to the housing panel by screws 31 or the like and the mirror 25 is bonded or otherwise secured to plate 29. The angle of inclination of the plate 29 and, therefore, the mirror 25 may be adjusted by any convenient means, such as the adjusting screw 32 rotatable by the knob 33.

The important feature of the present invention is that the plane of the mirror 25 is intersected by the plane of the roof panel 13 as represented by the line 34. With the mirror 25 positioned in this relationship to the roof panel 13, the single mirror provides dual fields of vision. This is indicated in FIG. 1 in which one field of vision or line of sight is represented by the lines 35a and 35b and the second field of vision or line of sight is represented by the lines 36a and 36b.

The lines 35a and 35b represent the field of vision extending below the roof panel 13 and through the rear window 14. This field of vision or line of sight is most important to the vehicle operator when operating the vehicle in a reverse direction such as when backing out of a garage or into a parking space.

The lines 36a and 36b represent the field of vision or line of sight extending through the housing window 22 and above the roof panel. This gives the vehicle operator a broad field of vision rearwardly of the vehicle, a field of vision which is unobstructed by the rear quarter panels 37 supporting the roof panel 13 or by the framing structures defining the body opening in which the window 14 is mounted.

The field of vision afforded by the rear view mirror over the roof panel is enhanced by the length of the mirror in a direction laterally of the vehicle body. Because of the length of the mirror, it has been found that only a single adjustment to permit variation of the angular relationship of the mirror is necessary to accommodate the eye height of the vehicle operator when seated directly behind the steering wheel 38. Even if the vehicle operator moves to a position so as to not be directly behind the steering wheel, this has only a minor effect on the viewing area over the top of the roof panel.

With the present mirror there are virtually no blind spots to the rear of the vehicle except as may be occasioned by a mini-car being driven at close quarters near the rear quarter on either side of a larger vehicle having the present mirror system mounted therein. But this would be true of almost any mirror system, whether it be a system embodying two mirrors or a periscopic arrangement of mirrors.

I claim:

1. A rear view mirror system for a vehicle having an upper body structure comprising a windshield, a roof panel extending rearwardly of said windshield and a window at the rear of said roof panel,
   a rearwardly facing mirror,
   mirror mounting means supporting said mirror in an aperture in said roof panel rearwardly adjacent the windshield,
   said mirror being supported with its plane intersected by the plane of the roof panel to provide dual fields of vision, one of which extends below the roof panel through the rear window and the other of which extends over said roof panel, said aperture in the roof panel being bounded by a laterally extending housing extending above the plane of the roof panel,
   the rear face of the housing having a window therein, the rear view mirror extending from beneath the plane of the roof panel upwardly into said housing.

2. A rear view mirror system according to claim 1 in which a hinge means supports the mirror for angular adjustment about a hinge axis extending substantially laterally of the longitudinal axis of the roof panel.

3. A rear view mirror system for a vehicle having an upper body structure comprising a windshield, a roof panel extending rearwardly of said windshield and a window at the rear of said roof panel,
   said roof panel having an aperture therein extending laterally of the longitudinal axis of the roof panel,
   a laterally extending housing bounding said aperture and extending above the plane of said roof panel,
   the rear face of said housing having an angularly inclined window therein,
   a rearwardly facing substantially planar mirror pivotally supported within said housing and projecting across the plane of said roof panel,
   said mirror providing dual fields of rear vision, one of which extends below the roof panel through the rear window and the other of which extends through the housing window over the roof panel.

4. A rear view mirror system according to claim 3 in which the pivotal support for the mirror comprises a hinge means having its hinge axis extending substantially laterally of the longitudinal axis of the roof panel.

5. A rear view mirror system according to claim 4 in which the mirror is located substantially between the longitudinal axis of the roof panel and one side thereof so as to be positioned forwardly above the head of the vehicle operator.

6. A rear view mirror system according to claim 3 in which the mirror is located substantially between the longitudinal axis of the roof panel and one side thereof so as to be positioned forwardly above the head of the vehicle operator.

References Cited

UNITED STATES PATENTS

| | | | |
|---|---|---|---|
| 2,082,775 | 6/1937 | Best | 350—307 |
| 3,229,580 | 1/1966 | Mitchell | 350—302 |

DAVID SCHONBERG, Primary Examiner

R. S. SHERMAN, Assistant Examiner

U.S. Cl. X.R.

350—288